Sept. 9, 1952          F. M. OSBORNE ET AL          2,609,690
                         OVEN THERMOMETER
                        Filed June 17, 1946
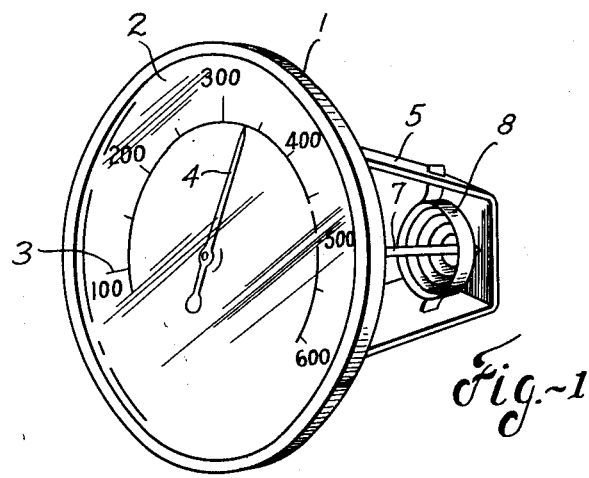
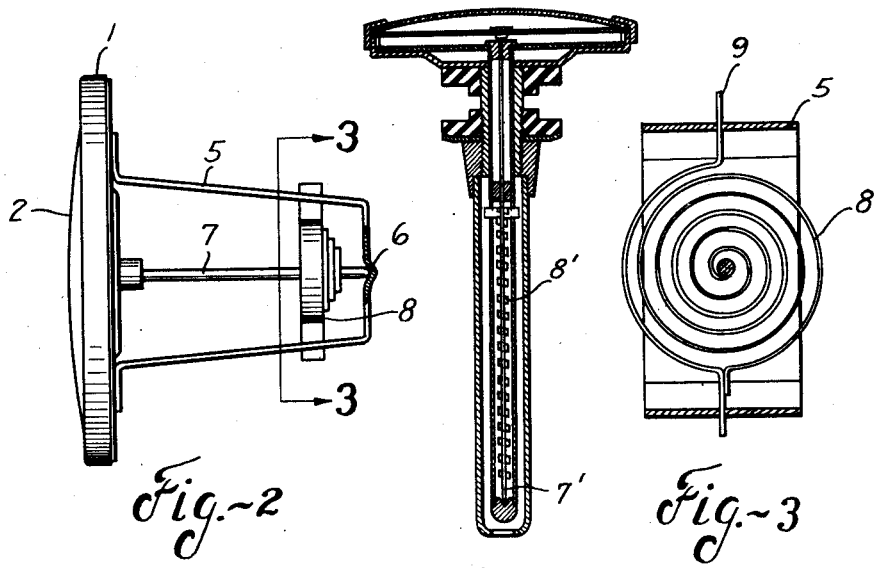
Inventor
Frank M. Osborne
Edwin Oblinger
By J. L. Walker  Attorney Patented Sept. 9, 1952

2,609,690

UNITED STATES PATENT OFFICE 2,609,690

OVEN THERMOMETER

Frank M. Osborne and Edwin Oblinger, Springfield, Ohio, assignors to The Ohio Thermometer Company, Springfield, Ohio, a corporation of Ohio Application June 17, 1946, Serial No. 677,328

2 Claims. (Cl. 73—367)

This invention pertains to measuring instruments, and more particularly to rotary thermally responsive devices, including thermometers, thermostats and temperature controlled regulators.

The object of the invention is to improve the construction as well as the means and mode of operation of thermally responsive rotary devices whereby they may not only be more efficient in use, automatic in operation, uniform in action, accurate in response to temperature change, having minimum working parts and unlikely to get out of repair.

A further object of the invention is to duofunctionally utilize the thermally responsive element, to not only impel rotary motion of the pivotal shaft and the indicator carried thereby but to simultaneously submit the pivotal shaft to longitudinal thrust pressure to prevent its accidental disengagement from its step bearing.

A further object of the invention is to provide a yielding abutment or anchorage against which the thermally responsive motive spring reacts, to minimize side strain and friction due to deformation of the spring into eccentric relation with the pivotal shaft.

A further object of the invention is to provide a thermally responsive measuring instrument or regulator, having the advantageous structural features and inherent meritorious characteristics and the mode of operation herein set forth or their equivalents.

For illustrative purposes the invention is herein shown embodied in an oven thermometer, but obviously is not necessarily limited thereto.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings wherein is illustrated the preferred, but obviously not necessarily the only form of embodiment of the invention, Fig. 1 is a perspective view of an assembled oven thermometer embodying the present invention.

Fig. 2 is a side elevation of the structure shown in Fig. 1.

Fig. 3 is a transverse sectional view on line 3—3 of Fig. 2.

Fig. 4 is a longitudinal sectional view of a modification of the embodiment shown in the preceding views.

Like parts are indicated by similar characters of reference throughout the several views.

Referring to the drawings, the illustrative oven thermometer comprises an indicator housing 1 having a transparent face 2, within which is enclosed a graduated dial 3, and a cooperating oscillatory pointer hand 4.

Attached to the back of the indicator housing 1 is a stirrup or bight shaped frame 5 in the closed end of which is a thrust or step bearing 6 for the end of the rotary spindle or pivotal shaft 7, to the opposite end of which the oscillatory pointer hand 4 is attached for unison rotation. The bearing engaging end of the shaft is tapered to a needle point of approximately twenty degrees to its axis. Surrounding the pivotal shaft 7 is a thermally responsive coiled spring 8, the inner end of which is fixedly attached to the spindle or shaft 7. The spring 8 may be bi-metal in character. The succeeding convolutions of the evolute spring 8 are axially offset as shown in Figs. 1 and 2, whereby in addition to its torsional influence, the spring exerts a longitudinal thrust pressure of the shaft 7 upon its seat 6.

Slidingly mounted in the opposite arms of the frame 5 is an abutment bridge 9 to which the outer end of the coil spring 8 is attached. Coil spring 8 reacts against the resistance of the shiftable bridge 9 which is capable of quite limited movement in alternate directions. The tightening or the expansion of the coils of the spring 8 under influence of temperature change tends to effect an eccentric relation of the spring coils about the pivotal shaft 7, which induces a slight side pressure and restricts free rotation of the shaft 7 in its bearing 6. Slight yielding motion of the sliding bridge piece 9, to the reactance of the coiled spring 8, automatically compensates for the tendency of the spring to assume eccentric relation with the shaft 7 and minimizes the frictional resistance to rotation of the latter.

It is found that this limited compensatory adjustment greatly improves the operation and accuracy of response of the instrument.

In Fig. 4 is shown a modification, wherein the coil spring 8' and pivotal shaft 7' are greatly elongated, but the spring nevertheless induces thrust engagement of the shaft in its bearing in addition to transmitting rotary motion thereto.

While as before mentioned the invention is especially applicable to a spring operated thermometer as illustrated and to a thermostatic instrument, both embodying indicating means, the structure may be utilized to operate a circuit closer to open and close an electrical circuit or through an amplifying means mechanically actuate a valve or other movable element.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms of modifications within the legitimate and valid scope of the appended claims.

Having thus described our invention, we claim:

1. A thermally responsive instrument, including a main frame presenting side portions and end portions, an indicator housing carried by one end portion of said frame, a graduated dial and cooperating pointer hand enclosed within the housing, a rotary shaft to which the pointer hand is attached for unison motion therewith, a thrust bearing for the shaft carried by the other end portion of the frame, a thermally responsive conical coiled spring surrounding the shaft to which the inner terminal of the spring is attached, a bridging abutment member the opposite ends of which are slidingly carried by the side portions of the main frame to which member the outer end of the spring is attached, said bridging abutment being slidable transversely of the frame and being automatically yielding under reactance of the spring to maintain concentricity of the spring and shaft and minimize side thrust of the shaft and frictional resistance to its rotation.

2. A thermally responsive instrument, including a frame presenting side portions and an end portion, a thrust bearing in said end portion, a pivotal shaft extending between said side portions and terminally engaging the thrust bearing, a thermally responsive conical spring one end thereof being fixed to the shaft duofunctionally transmitting torsional influence to said shaft and simultaneous thrust pressure of the shaft against said bearing, indicating means actuated by the rotation of the shaft, and a thrust member transversely slidingly supported by and between the said side portions of the frame, to which member the free end of the spring is fixedly secured.

FRANK M. OSBORNE.
EDWIN OBLINGER.

REFERENCES CITED

The following references are of record in the file of this patent:

UNITED STATES PATENTS

| Number | Name | Date |
| --- | --- | --- |
| 1,848,838 | Powers | Mar. 8, 1932 |
| 1,895,385 | Townsend et al. | Jan. 24, 1933 |
| 1,941,704 | Masury | Jan. 2, 1934 |
| 2,019,221 | Hastings | Oct. 29, 1935 |